US008526086B2

(12) United States Patent  (10) Patent No.: US 8,526,086 B2
Trantoul et al.  (45) Date of Patent: Sep. 3, 2013

(54) METALLISED FILM AND PROCESS FOR ITS MANUFACTURE

(75) Inventors: Francois Trantoul, Lunel (FR); Jean-Yves Leroy, Restinclieres (FR); Laurence Bes, Montpellier (FR)

(73) Assignee: Fasver, Baillargues (FR)

(*) Notice: Subject to any disclaimer, the term of this patent is extended or adjusted under 35 U.S.C. 154(b) by 238 days.

(21) Appl. No.: 12/771,050

(22) Filed: Apr. 30, 2010

(65) Prior Publication Data

US 2010/0277778 A1  Nov. 4, 2010

Related U.S. Application Data

(60) Provisional application No. 61/247,271, filed on Sep. 30, 2009.

(30) Foreign Application Priority Data

Apr. 30, 2009  (FR) ...................................... 09-02120

(51) Int. Cl.
*G03H 1/00*  (2006.01)

(52) U.S. Cl.
USPC ............................................. 359/2; 264/1.34

(58) Field of Classification Search
USPC ............. 359/1–35; 264/1.1–1.21, 1.31, 1.34, 264/1.7, 1.9; 283/86; 427/160
See application file for complete search history.

(56) References Cited

U.S. PATENT DOCUMENTS

| 5,629,068 | A | 5/1997 | Miekka et al. |
| 6,447,979 | B1* | 9/2002 | Hattori et al. ............. 430/270.1 |
| 6,592,972 | B1 | 7/2003 | Trantoul |
| 7,360,712 | B2 | 4/2008 | Trantoul et al. |
| 2003/0158308 | A1 | 8/2003 | Nay et al. |
| 2005/0266185 | A1* | 12/2005 | Sekiya et al. ............. 428/32.39 |
| 2006/0262367 | A1* | 11/2006 | Hattori et al. .................. 359/15 |
| 2007/0076279 | A1* | 4/2007 | Holmes et al. .................... 359/2 |
| 2008/0078498 | A1* | 4/2008 | Zeik et al. ..................... 156/277 |
| 2009/0236034 | A1 | 9/2009 | Leroy et al. |

FOREIGN PATENT DOCUMENTS

| EP | 0 201 323 A2 | 11/1986 |
| FR | 2 793 726 A1 | 11/2000 |
| FR | 2 840 431 A1 | 12/2003 |
| FR | 2 867 590 A1 | 9/2005 |
| FR | 2 897 556 A1 | 8/2007 |

OTHER PUBLICATIONS

French Search Report, dated Nov. 23, 2009, from corresponding French application.

* cited by examiner

*Primary Examiner* — Jennifer L. Doak
(74) *Attorney, Agent, or Firm* — Young & Thompson

(57) ABSTRACT

A metallised film includes at least one reflective layer (14, 17) of printed metallised ink, wherein the layer (17) of printed metallised ink includes a hardened binder incorporating at least one charge of metallised particles exhibiting a reflective metallic appearance, and the charge of metallised particles includes particles in the general form of platelets exhibiting reflective faces, and wherein the layer (17) of printed metallised ink is applied in contact with a layer (14, 15) exhibiting a surface tension greater than 40 dynes/cm and a smooth surface quality of specular reflection greater than 50%, measured in accordance with standard ISO 2813 with an angle of 60°. A process for manufacturing this film is also described.

20 Claims, 2 Drawing Sheets

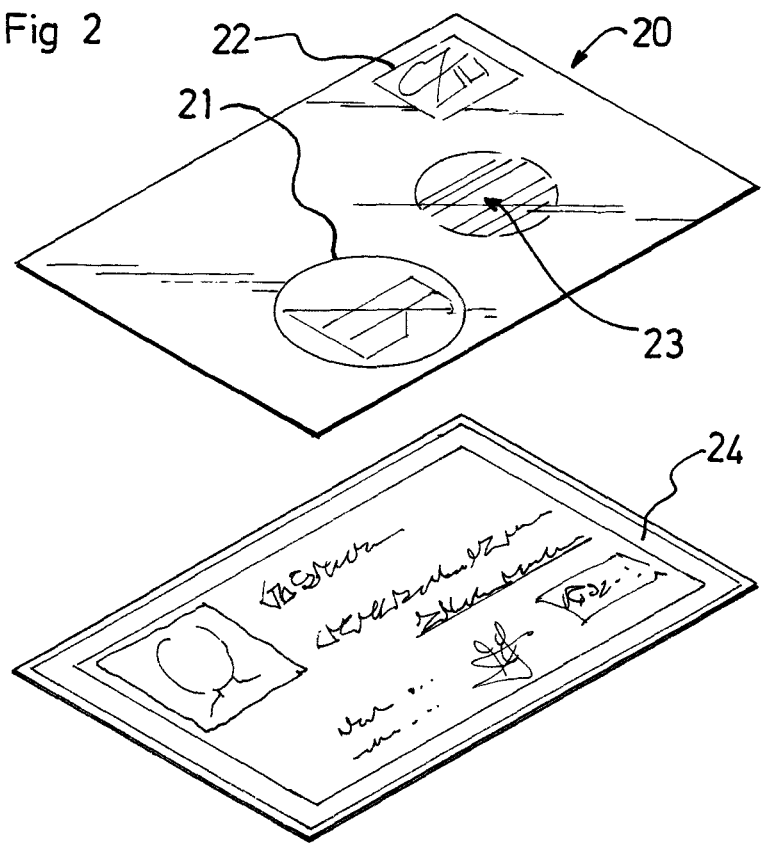
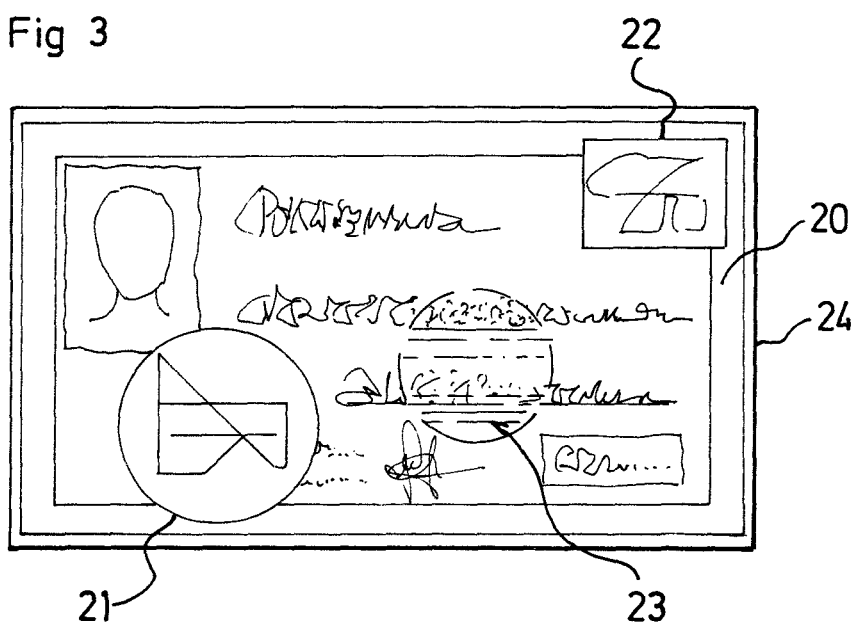

METALLISED FILM AND PROCESS FOR ITS MANUFACTURE

FIELD OF THE INVENTION

The invention relates to a film, in particular a metallised holographic film, and to a process for manufacture of such a film, in particular a metallised holographic film.

BACKGROUND OF THE INVENTION

The films known as metallised 'holographic' films are well-known and are used, in particular, for the marking of products or of official documents such as identity cards, passports, credit cards, cheques, banknotes, travel tickets, entrance tickets, cards giving an entitlement to various services, etc. Such a 'holographic' marking makes it possible, in particular, to make the product or document secure by identifying it and/or guaranteeing its authenticity and/or preventing its alteration and/or preventing its reproduction.

Such known holographic films may take the form of films on a reel to be cut off at the time of their application onto the product or document to be protected, pre-cut films in the form of vignettes to be integrated into the manufacture of a product or document, self-adhesive labels, or transfer films enabling the transfer of a 'holographic' mark onto a substrate to be marked (FR 2 897 556).

The known metallised holographic films include one or more transparent layers, at least one of which is embossed in such a way as to exhibit at least one motif that is capable of forming at least one image, named holographic image, which is visible by showing through and by diffraction. Throughout the text, by the term 'holographic' any image is designated that is formed by diffraction by a structure in relief.

In traditional manner these transparent layers include a polyester backing, possibly a detachment layer if it is a question of a transfer, and a embossing layer, the embossed motif being created on the face of this embossing layer opposite the backing. Various known processes may be used in order to create this embossed motif: application of a stamping die, embossing, engraving, beam of particles etc.

In order to impart a reflective metallised appearance to at least one portion of the motif, at least one reflective metallised layer is applied facing and in the format of said portion. Such a reflective metallised layer may be an HRI (High Reflex Index) layer, created by vacuum deposition by vaporisation of zinc sulfide and/or aluminium sulfide.

Then a step of selective subtractive dissolution of at least one such reflective metallised layer is carried out, in order to form motifs constituted by delimited portions of metallised holographic image(s), in particular when said reflective metallised layer is opaque. In order to do this, a layer of protective varnish is applied facing the portions that have to stay metallised, and the film is subjected to a chemical attack, for example by immersion in a corrosive bath such as a bath of sodium hydroxide at elevated temperature. After rinsing and neutralisation in an acid bath, the holographic film is obtained which is metallised facing certain portions (in general, opaque if the metallised layer is opaque), and transparent facing the other, non-metallised portions. This known process is the only one that enables metallised holographic motifs of relatively fine resolution to be obtained, in particular graphics or texts of maximum line width of the order of 0.6 mm, or motifs ornamented with guilloche of maximum line width of the order of 0.1 mm.

In a known variant, firstly a continuous HRI layer is applied which remains at least partially transparent facing all the holographic images and substantially in the format of the embossed layer, then a layer of opaque metallic deposit delimited by selective subtractive dissolution is applied, in order to form motifs as indicated above.

These manufacturing processes are costly, require complex and costly specific plants, involve carrying out several (at least four) successive steps, and are long and difficult to implement (vacuum deposition and chemical attack).

These processes cannot be implemented at sites in industrially underdeveloped countries. Now it would be advantageous to be able to carry out the manufacture of holographic markings, in particular for purposes of security, as close as possible to the sites of use, and not only for reasons of economy and respect for the environment but also in order to avoid the intervention of multiple persons, delays and transportation, likely to constitute risks as regards security.

In addition, these steps of vacuum deposition and chemical attack are not respectful of the environment and require a specific and costly management of waste. In particular, it should be noted that the steps making it possible to carry out the chemical attack bring about washing water and rinsing water containing toxic metallic substances which themselves have to be the subject of purification treatments.

Furthermore, the steps of chemical attack are likely to dissolve or damage not only the unprotected portions of the transparent metallised layer but also the possible underlying layers, for example portions of an HRI reflective layer formed from a deposit of zinc sulfide, and/or other inscriptions on the security device possibly incorporated beforehand. Consequently, the known processes for manufacture of holographic films are not very compatible with the preparation of complex films exhibiting a plurality of different devices providing a plurality of distinct security functions.

The films obtained are therefore also costly and limited in their applications. In particular, it should be noted that a significant part of the raw material being used for the manufacture of the films is rejected in the form of waste (portions of the metallised layer dissolved by chemical attack).

In addition, the reflective metallised motifs capable of being created by the delimitation of the portions of metallised holographic image(s) cannot exhibit very great fineness in width and/or line width, nor complex and contorted shapes incompatible with the chemical attack carried out subsequently.

Furthermore, in another variant described in U.S. Pat. No. 5,629,068 a layer of metallic-effect ink, capable of containing metallic lamellae, is applied directly onto an embossed layer. In the process for manufacture described in U.S. Pat. No. 5,629,068, the metallic lamellae have to be very fine and of sufficiently significant length and width in order to be able to connect the peaks of the motifs in relief of the embossed layer. The reflective metallised motifs thus created are, however, limited in terms of holographic effects and applications.

The invention aims to overcome these disadvantages.

SUMMARY OF THE INVENTION

The invention therefore aims, in particular, to propose a metallised film, in particular a metallised holographic film, that is of low cost and capable of exhibiting reflective metallised motifs of very great fineness, typically with a dimension in width smaller than 1 mm, in particular of the order of 0.5 mm, and/or a character height and/or line width smaller than 0.6 mm, more particularly smaller than 0.1 mm, with shapes that are capable of being complex and/or contorted, for example complex graphics, texts or motifs ornamented with guilloche.

The invention also aims to propose such a metallised film that is capable of exhibiting coloured appearances other that the usual gold or silver appearances which it is possible to obtain by vacuum metallic deposition.

The invention also aims to propose such a holographic film exhibiting opaque reflective metallised portions facing holographic images, and transparent portions—in particular, reflective transparent portions facing holographic images.

The invention also aims to propose such a film, in particular a holographic film, that is capable of incorporating other inscriptions and/or devices and/or security motifs.

The invention aims to propose such a film, in particular a holographic film, that may be the subject of numerous applications, in particular of applications other than those for which the known films, in particular the holographic films, are used.

The invention also aims to propose a process for manufacture of such a film, in particular a holographic film, according to the invention, that is simple, not very costly, and comprises a smaller number of steps. It aims, in particular, to propose such a process for manufacture that may be implemented with simple and not very costly means, at various sites, including non-industrial sites and in underdeveloped countries, in the immediate proximity of the sites of use of the films thus manufactured.

The invention also aims to propose a process for manufacture which is more respectful of the environment and with which the management of waste is simplified.

The invention also aims to propose such a process that enables the creation of reflective metallised motifs with shapes that are capable of being complex and/or contorted, for example texts or motifs ornamented with guilloche.

In order to do this, the invention relates to a metallised film including at least one reflective layer, said reflective layer being a layer of printed metallised ink, wherein said layer of printed metallised ink includes a hardened binder incorporating at least one charge of metallised particles exhibiting a reflective metal appearance, said charge of metallised particles includes particles in the general form of platelets exhibiting reflective faces, and wherein said layer of printed metallised ink is applied in contact with a layer exhibiting a surface tension greater than 40 dynes/cm and a smooth surface quality of specular reflection greater than 50%, measured in accordance with standard ISO 2813 with an angle of 60°.

The invention extends to a process for manufacture of a film according to the invention. It therefore also relates to a process for manufacture of a metallised film, in which:

use is made of at least one backing, at least one reflective layer is applied extending facing said backing, in order to create at least one reflective layer, a layer of metallised ink is printed facing said backing, wherein in order to create said layer of printed metallised ink, use is made of a printing composition including a hardenable binder incorporating at least one charge of metallised particles exhibiting a reflective metal appearance, use is made of a printing composition including, by way of charges of metallised particles, particles in the general form of platelets exhibiting reflective faces, and wherein said layer of printed metallised ink is printed in contact with a layer exhibiting a surface tension greater than 40 dynes/cm and a smooth surface quality of specular reflection greater than 50%, measured in accordance with standard ISO 2813 with an angle of 60°.

The creation of a reflective layer by simple printing of a layer of metallised ink makes it possible to be liberated from the steps of vacuum metallisation and selective subtractive dissolution by chemical attack, and from the numerous disadvantages that result therefrom.

Advantageously and according to the invention, a metallised film according to the invention includes at least one transparent layer. Said transparent layer may, for example, be constituted by a transparent thin film made of polyurethane.

In a particularly advantageous embodiment of a film according to the invention, said transparent layer is a holographic layer exhibiting at least one motif that is capable of forming at least one image, named holographic image, which is visible by showing through and by diffraction, and said reflective layer extends facing and in the format of at least one holographic image, said reflective layer being a layer of printed metallised ink facing and in the format of at least one holographic image, thus forming a metallised holographic image.

The inventors have in fact ascertained, in quite surprising manner, that the printing of a layer of metallised ink onto a layer exhibiting such surface properties, and not directly onto the holographic layer, makes it possible to favour the alignment of any type of metallised particles parallel to the surface of said layer exhibiting such surface properties in contact with the layer of metallised ink without necessitating selecting metallised particles of specific grain-size distribution, in particular having lengths or widths pertaining to a specific range.

In addition, this printing enables the creation of reflective metallised motifs of any shape, with very great fineness, in a manner similar to the printing of any printed motifs. The quality and the precision of these metallised motifs depend solely on the printing process being used, this latter being capable of being chosen from all the printing processes: serigraphy, flexography, offset printing, lithography, heliography etc. Metallised motifs can thus be easily created, in particular metallised holographic motifs, formed of texts or ornamented with guilloche with very great fineness, and transmitted in reflection with an efficiency greater than 90%. Advantageously and according to the invention, at least one layer of metallised ink is printed by serigraphic printing.

Advantageously and according to the invention, at least one layer of metallised ink is printed by flexography, in particular with the aid of rollers made of ceramic material, named 'anilox rollers'. The anilox rollers that are used are, for example, those marketed by PRAXAIR, the weft surface of which is 160 L/cm, the cell volume of which is 15 $cm^3/m^2$, and the cells of which exhibit an angle of 45°. This method of printing by flexography with the aid of anilox rollers makes it possible to print motifs of definition 400 lpi.

In addition, the creation of these motifs with such a layer of printed metallised ink is particularly simple, economical, avoids any wastage of raw materials, is respectful of the environment (in particular, does not generate any metallic waste), is easy to implement at any sites, including in developing countries, in proximity to the sites of use. The process can be carried out continuously, starting from a holographic film on a reel, in order to obtain a holographic film according to the invention.

Furthermore, the printing of a layer of metallised ink is perfectly compatible with all the other layers and all the other motifs and/or security devices created beforehand.

Advantageously and according to the invention, said layer of printed metallised ink includes a hardened binder incorporating at least one charge of metallised particles exhibiting a reflective metallic appearance. In particular, advantageously and according to the invention, said layer of printed metallised ink includes at least one charge of metallised particles chosen from pigments metallised under vacuum and reflective metallic particles. By the term 'metallic particles', the particles created from at least one metal or a metallic alloy exhibiting a reflective appearance, for example an alloy of aluminium and/or copper, are designated. Advantageously and according to the invention, the metallised particles are formed from a metallic deposit obtained by vacuum vaporisation or comprising such a deposit imparting their metallised appearance.

Preferably, advantageously and according to the invention, said charge of metallised particles preferably includes particles in the general form of platelets exhibiting reflective faces favouring the phenomena of reflection. These platelets and their faces may be plane or skew, of any contour, capable of being defined and identical for all the platelets, or, on the contrary, random and/or undefined (varying from one platelet to another), in particular in the general form of petals, shavings or shards. In addition, advantageously and according to the invention, said layer of printed metallised ink is applied in contact with a layer of varnish exhibiting a surface tension greater than 40 dynes/cm and a smooth surface quality of specular reflection greater than 50%, measured in accordance with standard ISO 2813 with an angle of 60°. Indeed, it has turned out that the printing of a layer of metallised ink onto such a layer of varnish makes it possible to favour the alignment of the metallic particles parallel to the surface of the layer of varnish, thus creating a covering in the manner of scales, enhancing the reflection effect considerably.

In addition, advantageously and according to the invention, the metallised particles exhibit a mean grain-size distribution ranging between 8 μm and 11 μm.

In addition, advantageously and according to the invention, at least one holographic layer is formed from a transparent layer embossed in such a way as to exhibit microstructures that are capable of forming at least one holographic image.

Furthermore, advantageously and according to the invention, said layer of printed metallised ink extends in accordance with at least one motif exhibiting a format smaller than that of the film. In other words, the holographic motif(s) formed by said layer of printed metallised ink extends/extend on one part only of the face of the holographic layer on which it/they is/are printed.

In a preferential embodiment, a film according to the invention is characterised in that it includes:
  a transparent backing defining its format,
  at least one holographic layer covering said backing and of a format similar to that of the backing,
  at least one layer of transparent varnish covering the holographic layer(s) and of a format similar to that of the backing,
and in that each layer of printed metallised ink extends on the last layer of transparent varnish according to a format smaller than that of the backing. In this embodiment, a holographic film according to the invention is transparent, with the exception of the metallised portions formed by the printed metallised layer which forms opaque reflective metallised holographic motifs.

Furthermore, a film according to the invention advantageously also includes at least one layer with high index of optical refraction between the holographic layer(s) and each layer of printed metallised ink. In one advantageous embodiment and according to the invention, each layer with high index of optical refraction extends according to a format similar to that of the backing.

Furthermore, according to an advantageous embodiment, a film according to the invention includes, in addition, at least one layer of protective varnish extending overlapping the layer(s) with high index of optical refraction, each layer of printed metallised ink extending onto the last layer of protective varnish. Preferably, said last layer of protective varnish exhibits, on its face covered by each layer thus printed and metallised, a very smooth surface quality and in particular a smooth surface quality of specular reflection greater than 50%, measured in accordance with standard ISO 2813 with an angle of 60°.

Furthermore, there is nothing to prevent providing other intermediate layers, other printings of security devices or inscriptions, for example as described in patents FR 2 840 431, FR 2 793 726, FR 2 867 590, or others, this list not being restrictive. For example, at least one layer of tinted translucent varnish may be provided prior to printing of the motifs formed by the layer of metallised ink, in such a way as to colour each metallised holographic image thus formed.

In addition, advantageously a film according to the invention includes a layer of adhesive opposite the backing. In this way, a film according to the invention may be applied onto a substrate, thanks to this layer of adhesive which may just as well be an adhesive sensitive to pressure at ambient temperature (self-adhesive) or an adhesive that is capable of being reactivated when hot, or other.

Equally, there is nothing to prevent providing a detachment layer between the backing and the holographic layer(s), in such a way as form a transfer.

Furthermore, according to another advantageous embodiment, said layer of varnish may include dyes soluble in organic solvents or transparent pigments that are suitable to enable the attainment of a coloured mirror effect.

In another advantageous embodiment, use is made of a printing composition including a hardened binder incorporating at least one dye that is soluble in organic solvents and that is suitable to enable the attainment of a coloured mirror effect.

A process according to the invention is also advantageously characterised in that it is suitable to obtain a film according to the invention as mentioned above.

In a particularly advantageous embodiment of a process according to the invention, with at least one transparent layer, named holographic layer, at least one motif is created that is capable of forming at least one image, named holographic image, which is visible by showing through and by diffraction, and a layer of metallised ink is printed facing and in the format of at least one holographic image in such a way as to obtain a metallised holographic image.

In particular, advantageously and according to the invention, in order to create said layer of printed metallised ink a printing composition is used including a hardenable binder incorporating at least one charge of metallised particles exhibiting a reflective metallic appearance. For example, advantageously and according to the invention, use is made of a printing composition including at least one charge of metallised particles chosen from metallised pigments and reflective metallic particles. In addition, a process according to the invention is also advantageously characterised in that use is made of a printing composition including, by way of charges of metallised particles, particles in the general form of platelets exhibiting reflective faces, and in that said layer of printed metallised ink is printed in contact with a layer of varnish exhibiting a surface tension greater than 40 dynes/cm and a smooth surface quality of specular reflection greater than 50%, measured in accordance with standard ISO 2813 with an angle of 60°.

The invention also relates to a holographic film and to a process for manufacture, characterised in combination by all or some of the characteristics mentioned above or below.

BRIEF DESCRIPTION OF THE DRAWINGS

Other aims, characteristics and advantages of the invention are evident from the following description which refers to the annexed Figures which represent, in non-limiting manner, an exemplary embodiment of the invention and in which:

FIG. 2 is a schematic view in perspective illustrating a holographic film according to the invention in the course of application onto a substrate to be protected, FIG. 3 is a schematic view from above illustrating the protected substrate obtained by application of a holographic film according to the invention in conformity with FIG. 2.

DETAILED DESCRIPTION OF THE INVENTION

In FIGS. 1a to 1e the scales of thickness are exaggeratedly enlarged and not proportionally observed, for the purposes of illustration. These Figures represent an example of a process for manufacture, according to the invention, of a partially metallised holographic transparent film according to the invention.

The starting-point is a multi-layer assembly, named holographic film 10, 11, 12, including:
- a layer 10 of transparent backing which, for example, is formed from a PET polyester film and exhibits a thickness generally ranging between 10 μm and 50 μm, in particular of the order of 20 μm,
- a transparent embossing assembly which includes at least one transparent layer (that is to say, a single layer for transparent embossing as schematised in the Figures, or a transparent multi-layer embossing complex), and the thickness of which generally ranges between 1 μm and 50 μm, for example of the order of 5 μm,
- possibly (if the film according to the invention has to be a transfer), a detachment layer 11 which, for example, is realised from wax or silicone or other, interposed between the backing layer 10 and the embossing assembly.

Figure 1A:
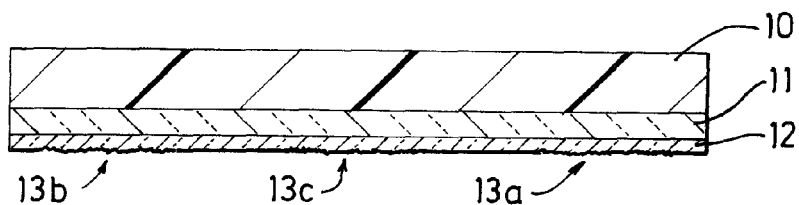
FIGS. 1a to 1e are schematic views in section representing various successive steps of a process for manufacture according to an exemplary embodiment of the invention.
Figure 1B:
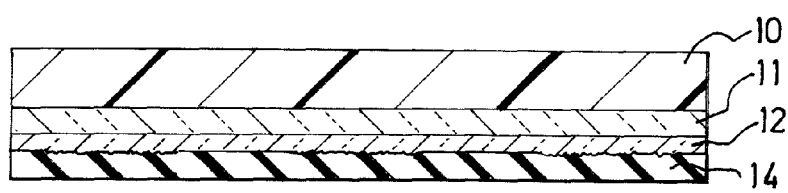
Figure 1C:
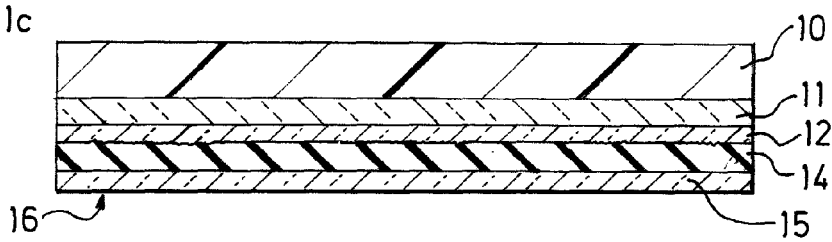

In the example represented in FIG. 1a, three holographic images 13a, 13b, 13c are created by microstructures formed on the face of the embossing assembly opposite the backing film 10, these microstructures being created in such a way as to form motifs that are visible by diffraction (diffraction patterns, holograms etc.) and by showing through the holographic film 10, 11, 12. Such holographic images 13a, 13b, 13c are, in general, themselves sufficiently transparent in order not to be opaque—that is to say, they enable the visualisation of inscriptions or of motifs that they are likely to cover when the film is subsequently applied onto a substrate.

A layer 14 of HRI dielectric material with high index of optical refraction (that is to say, typically of the order of 2.4) is then created (FIG. 1b), overlapping the embossing assembly and the holographic images 13a, 13b, 13c. Such a layer 14 may be created by vacuum deposition, for example by vaporisation of zinc sulfide with a thickness of the order of 60 nm. This fine layer 14 is reflective, in the sense that it makes it possible to increase the reflective power in visible light by the order of 20%. However, it remains sufficiently transparent in order not to be opaque—that is to say, in order to enable the visualisation of inscriptions or of motifs that it is likely to cover when the film is subsequently applied onto a substrate.

Onto this reflective layer 14, when it is provided (in its absence, directly onto the embossed assembly 12), a layer 15 of transparent finishing varnish is printed exhibiting a very smooth surface 16 and with high surface tension—that is to say, free from surface defects (such as orange peel, fisheyes or pinholes)—and suitable to exhibit a surface tension greater than 40 dynes/cm and a smooth surface quality of specular reflection greater than 50%, measured in accordance with standard ISO 2813 with an angle of 60°. In order to do this, use may be made of a varnish composition for ultraviolet drying or with acrylic solvent, having a transparency greater than 90%, which is highly lustrous, for example as marketed under the reference Ultraflex® by Marabu (www.marabu-druckfarben.de), or other. This layer 15 of transparent varnish may be tinted and/or may cover a layer of tinted varnish created beforehand (not represented in the Figures), making it possible to modify the background colour of the holographic film according to the invention that is obtained, and in particular the metallic effect created as indicated below.

The layer 15 of varnish may include dyes soluble in organic solvents or transparent pigments that are suitable to enable the attainment of a coloured mirror effect. In order to do this, use may be made of a composition of a transparent varnish for ultraviolet drying as marketed under the reference Marastar SR by MARABU (France), to which 5 to 25% of an ink for ultraviolet drying of yellow-gold colouring is added, as marketed by Tiflex (Poncin, France), reference 3*5559.

It should be noted that the layer 15 of finishing varnish may be omitted if the surface quality of the reflective layer 14 is sufficient—that is to say, is smooth, of specular reflection greater than 50%, measured in accordance with standard ISO 2813 with an angle of 60°.

Onto the surface 16 of the layer 15 of finishing varnish, or onto the surface of the reflective layer 14 if the layer of finishing varnish is omitted, a layer 17 of metallised ink is printed facing the holographic images 13a, 13b which have to be metallised. Thus this layer 17 of metallised ink is printed in such a way as to form motifs 17a, 17b extending facing, respectively, each holographic image 13a, 13b.

This printing may be carried out by any traditional printing process and may therefore exhibit the qualities and properties thereof. For example, the layer 17 of metallised ink is printed by serigraphy. The layer 17 of metallised ink may also be printed by flexography.

In order to create the layer 17 of metallised ink, an appropriate printing composition is used including a charge of metallised particles exhibiting a reflective metallic appearance, dispersed in a hardenable binder composition which may be formed from a traditional transparent printing ink, for example a composition of transparent solvent ink marketed by Mistral Graphic (Carcassonne, France). The layer 17 of metallised ink is printed, like a layer of traditional ink, onto a layer (varnish layer 15 or reflective layer 14) with high surface tension and exhibiting a very smooth surface, in particular a surface tension greater than 40 dynes/cm and a smooth surface quality of specular reflection greater than 50%, measured in accordance with standard ISO 2813 with an angle of 60°.

Said charge of metallised particles may incorporate particles in the general form of platelets, for example in the form of petals, shavings or shards, which themselves have been manufactured beforehand by vacuum metallisation. Such particles may be obtained by vacuum sublimation and vaporisation of metallic aluminium onto a backing such as a polyester film, the fine layer of aluminium obtained being then detached from the backing, then crushed with the desired grain-size distribution, in particular ranging between 8 μm and 11 μm, with a thickness of the order of 300 angstroms, corresponding to that of the deposited layer of aluminium.

In a variant or in combination, the charge of metallised particles may incorporate metallised particles chosen from the composition of metallised pigments marketed under the reference Xymara Metasheen® by Ciba (Basle, Switzerland)

and the composition of metallised pigments marketed under the reference StarBrite® by Silberline (Leven, United Kingdom).

These metallised particles are used with a sufficient quantity in the printing composition in order to procure, according to the printing process being used, the desired reflective effect after printing and hardening. For example, in the case of a serigraphic printing the charge quantity of metallised particles in the printing composition ranges between (proportions by volume) 5% and 15%, in particular is of the order of 10%.

Such a layer 17 of metallised ink is reflective and opaque and may therefore exhibit properties similar to those of a metallic deposit under vacuum. For example, said layer makes it possible to increase, by the order of 80%, the reflective optical power of the film in visible light. It should be noted, however, that the invention precisely makes it possible to adjust the properties of reflection and opacity of this layer 17 of metallised ink according to various values, as a function of the application. By decreasing the quantity of the charge of metallised particles, the reflexivity and the opacity of the layer 17 of metallised ink are decreased. On the contrary, by increasing the quantity of this charge, the reflexivity and the opacity are increased.

In order to obtain a coloured mirror effect, use may be made of a printing composition including a hardened binder incorporating at least one dye that is soluble in organic solvents, such as those marketed by CIBA (Basle, Switzerland), reference Ciba OROSOL.

Without addition of dyes to the printing composition including the metallised particles, a silver-mirror effect is obtained. In order to obtain a gold appearance, use is made of dyes of orangey-yellow tint; in order to obtain a chrome appearance, use is made of dyes of blue tint; in order to obtain a nickel appearance, use is made of dyes of green tint; in order to obtain a copper appearance, use is made of dyes of orangey-red tint.

In addition, the metallised particles exhibit mean dimensions that are suitable to enable printing in accordance with the printing process that has been retained, with the necessary precision and quality. Advantageously, the metallised particles exhibit a mean grain-size distribution ranging between 8 µm and 11 µm with, in the case of platelets, a thickness of the order of 300 angstroms.

Furthermore, it is established that the printing of a layer of metallised ink including a charge of metallised particles in the general form of platelets on the layer 15 of very smooth finishing varnish and with high surface tension brings about, despite the small dimensions of these metallised particles, the spontaneous coating of the various particles parallel to the surface, considerably enhancing the reflection effect obtained. In this way, for the same optical effect the charge quantity of metallised particles can be reduced, facilitating the operations for carrying out the printing of the layer 17 of metallised ink.

Figure 1D:
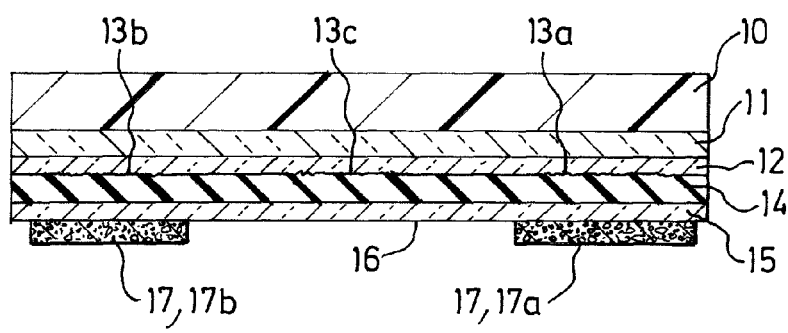
Figure 1E:
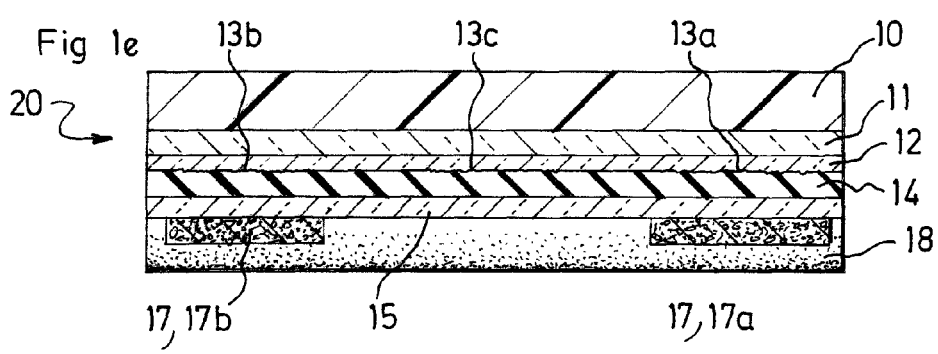

In the example represented in FIG. 1d, only two holographic images 13a, 13b are covered by motifs 17a, 17b of reflective printed metallised ink, and one holographic image 13c is not covered by such a metallised motif.

In a subsequent step (FIG. 1e), the film is covered by a continuous layer 18 of adhesive, preferably at least substantially in the format of the backing 10. This layer of adhesive may itself be covered by a separable protective sheet (not represented), such as a silicone-treated paper.

Thus a holographic film 20 according to the invention is obtained which may be applied in the form of an adhesive label or in the form of a transfer onto a substrate 24 to be protected, as represented in FIG. 2. The result represented in FIG. 3 is then obtained. As can be seen, the two holographic images 13a, 13b covered by motifs 17a, 17b of reflective printed metallised ink form opaque metallised holographic motifs 21, 22 which are visible by showing through but which mask the underlying inscriptions and motifs.

In addition, the holographic image 13c not covered by a metallised motif forms a holographic motif 23 which is also visible by showing through, the HRI reflective layer 14 favouring the visualisation of the corresponding holographic image 13c. Nevertheless, this holographic motif 23 is not opaque and can cover underlying inscriptions or motifs (for example, variable inscriptions of an identity card or of a passport) without totally masking them, in particular in such a way as to enable the reading thereof by virtue of showing through.

It should be noted that, in the example represented schematically in FIGS. 2 and 3, the motifs 21, 22, 23 are represented by simple geometrical shapes.

Nevertheless, the invention makes it possible to create motifs 17a, 17b of reflective printed metallised ink, and therefore opaque metallised holographic motifs 21, 22 of high definition, with very complex and very fine shapes, for example in the form of logotypes of mean area smaller than 5 $cm^2$—in particular of the order of 1 $cm^2$—and/or in the form of fine texts of character height 0.6 mm and/or in the form of microtexts of character height less than 0.1 mm and/or in the form of motifs ornamented with guilloche of line width 0.1 mm or others, with a very high definition. In fact, these motifs are created by printing, for example by serigraphic printing.

In the preferential example of holographic film 20 according to the invention which is represented in the Figures, the transparent backing 10, the detachment layer 11 which is possibly provided, the embossed assembly 12, the HRI reflective layer 14, the layer 15 of finishing varnish, and the layer 18 of adhesive are preferably at least substantially in the same format, which may correspond, for example, to the format of an adhesive vignette intended to cover an official document as represented in the example shown in FIGS. 2 and 3. On the other hand, the layer 17 of printed metallised ink is created with motifs exhibiting a format smaller than that of the transparent backing 10, and in general with discontinuous motifs.

Any other variant may nevertheless be envisaged, according to the applications, for example with a transparent backing 10 exhibiting a format larger than all the other layers, with formats of the various layers that vary slightly or in a significant manner, some in relation to the others, and even with a layer 17 of completely continuous printed metallised ink, for example in the format of the backing 10.

More generally, the invention may be the subject of numerous variants and different applications beyond the embodiments described above. In particular, the metallised film according to the invention does not necessarily includes an holographic layer.

The invention claimed is:

1. A metallised film including at least one reflective layer, said reflective layer being a layer of printed metallised ink, wherein said layer of printed metallised ink includes a hardened binder incorporating discrete solid metallised particles exhibiting a reflective metal appearance and a grain-size distribution, said metallised particles being made of metallised pigments of metallic particles in the general form of platelets exhibiting reflective faces, each metallised particle being in the general form of a platelet, and wherein said layer of printed metallised ink is applied in contact with a layer exhibiting a surface tension greater than 40 dynes/cm and a smooth surface quality and a specular reflection greater than 50, measured in accordance with standard ISO 2813 with an angle of 60°.

2. The film as claimed in claim 1, wherein said layer of printed metallised ink includes metallised particles chosen from pigments metallised under vacuum and reflective metallic particles.

3. The film as claimed in claim 2, wherein said metallised particles exhibit a mean grain-size distribution ranging between 8 μm and 11 μm.

4. The film as claimed in claim 1, wherein said metallised particles exhibit a mean grain-size distribution ranging between 8 μm and 11 μm.

5. The film as claimed in claim 1, wherein it includes at least one transparent layer.

6. The film as claimed in claim 5, wherein
said transparent layer is a holographic layer exhibiting at least one motif that is capable of forming at least one image, named holographic image, which is visible by showing through and by diffraction,
said reflective layer extends facing and in the format of at least one holographic image, said reflective layer being a layer of printed metallised ink facing and in the format of at least one holographic image to form a metallised holographic image.

7. The film as claimed in claim 6, wherein at least one holographic layer is formed from a transparent layer embossed in such a way as to exhibit microstructures that are capable of forming at least one holographic image.

8. The film as claimed in claim 5, wherein at least one holographic layer is formed from a transparent layer embossed in such a way as to exhibit microstructures that are capable of forming at least one holographic image.

9. The film as claimed in claim 5, wherein said layer of printed metallised ink extends in accordance with at least one motif exhibiting a format smaller than that of the film.

10. The film as claimed in claim 5, wherein the film includes
a transparent backing defining a format for the film,
at least one holographic layer covering said backing and of a format similar to that of the backing,
at least one transparent layer covering the holographic layer(s) and of a format similar to that of the backing,
and wherein each layer of printed metallised ink extends over the last transparent layer in accordance with a format smaller than that of the backing.

11. The film as claimed in claim 10, wherein the film includes at least one layer with high index of optical refraction between the holographic layer(s) and each layer of printed metallised ink.

12. The film as claimed in claim 11, wherein each layer with high index of optical refraction extends in accordance with a format similar to that of the backing.

13. The film as claimed in claim 10, wherein the film includes a layer of adhesive opposite the backing.

14. The film as claimed in claim 10, wherein the film includes a detachment layer between the backing and the holographic layer(s) in such a way as to form a transfer.

15. The film as claimed in claim 1, wherein it includes at least one layer with high index of optical refraction between the holographic layer(s) and each layer of printed metallised ink.

16. A process for manufacture of a metallised film, comprising:
providing at least one backing;
applying at least one reflective layer extending facing said backing;
printing a layer of metallised ink facing said baking in order to create at least one reflective layer;
wherein
in order to create said layer of printed metallised ink, a printing composition is used including a hardenable binder incorporating discrete solid metallised particles exhibiting a reflective metallic appearance and a grain-size distribution,
a printing composition is used that includes, by way of metallised particles, metallised pigments or metallic particles in the general form of platelets exhibiting reflective faces, each metallised particle being in the general form of a platelet, and
wherein said layer of printed metallised ink is printed in contact with a layer exhibiting a surface tension greater than 40 dynes/cm and a smooth surface quality and of specular reflection greater than 50, measured in accordance with standard ISO 2813 with an angle of 60°.

17. The process as claimed in claim 16, wherein
with at least one transparent layer, named holographic layer, at least one motif is created that is capable of forming at least one image, named holographic image, which is visible by showing through and by diffraction,
a layer of metallised ink is printed facing and in the format of at least one holographic image in such a way as to obtain a metallised holographic image.

18. The process as claimed in claim 16, wherein at least one layer of metallised ink is printed by serigraphic printing.

19. The process as claimed in claim 16, wherein at least one layer of metallised ink is printed by flexography.

20. The process as claimed in claim 16, wherein a printing composition is used that includes at least one charge of metallised particles chosen from metallised pigments and reflective metallic particles.

* * * * *